J. STILWELL.
Churn.
No. 32,388.
Patented May 21, 1861.
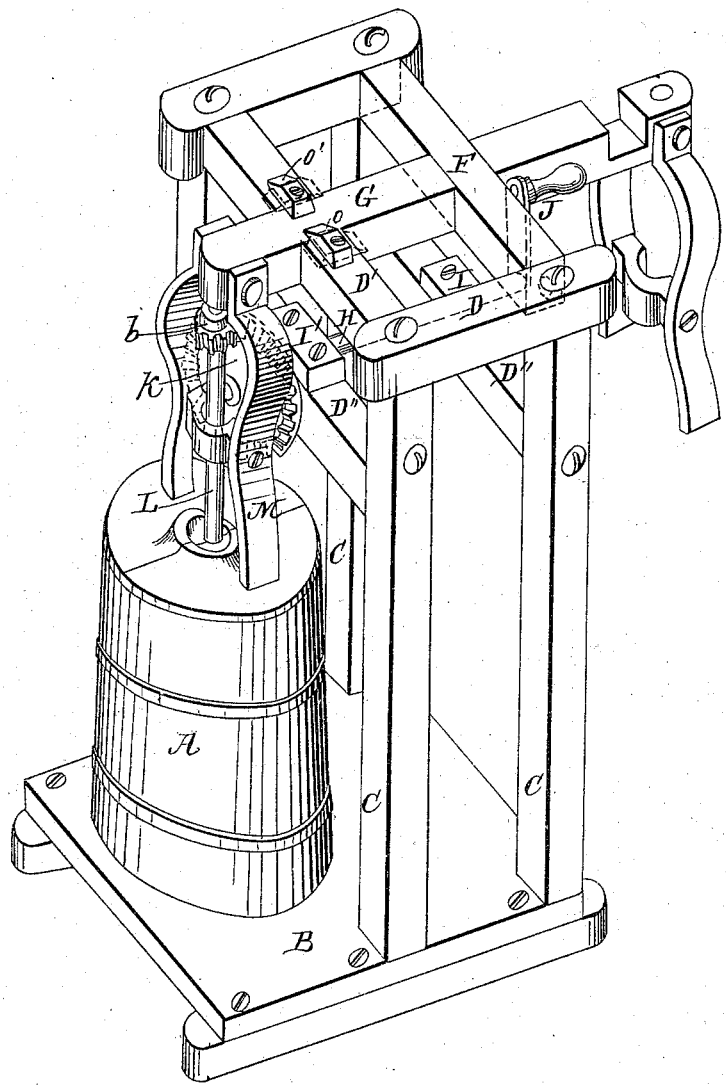
Witnesses
Inventor

UNITED STATES PATENT OFFICE.

JOHN STILWELL, OF GRIFFIN, GEORGIA.

CHURN.

Specification of Letters Patent No. 32,388, dated May 21, 1861.

*To all whom it may concern:*

Be it known that I, JOHN STILWELL, of Griffin, in the county of Spalding and State of Georgia, have invented a new and useful Improvement in Churns; and I do hereby declare that the following is a full, clear, and exact description of the same, reference being had to the accompanying drawing, making part of this specification, and being a perspective view of my invention.

My invention consists in the combination and arrangement of parts of a churn as hereinafter fully explained.

To enable others skilled in the art to make and use my invention I will proceed to describe its construction and operation.

A, represents a cylindrical box or barrel churn which contains the cream.

B, represents a base upon which the barrel and frame are supported.

C, C, are uprights mortised into or otherwise attached to the base B, at bottom and fastened by cross ties D, D, at top.

G, represents an arm rigidly attached to the cross bar F, which is provided with journals at each end fitting in boxes in the cross ties D, so as to permit the said arm to be turned over out of the way. The arm G, is tenoned near its front end into the cross tie D, for the purpose of bringing it parallel with the base of the framing and also to prevent lateral movement of the same.

H, represents the main driving shaft journaled in boxes I, I' attached to the cross ties D'', D'', and provided at one end with a winch or crank J.

K, is a bevel gear wheel secured upon the opposite end of the same shaft.

L, represents the staff or beater shaft fitted into a step in the bottom of the churn and at top in the under side of the arm G, near the front end thereof.

M, is a stirrup or forked brace bar attached to the hinged arm G, so that it can be turned up to permit the two half covers to be removed from the churn for inspection, without moving the hinged arm G.

b, is a pinion secured upon the upper end of the beater shaft and meshing into bevel gear wheel k.

O, O', are buttons attached to the cross tie for the purpose of holding the arm rigidly in position.

By means of the forked brace bar the churn is held in position in the frame without other fastening and the cover firmly fastened thereon, thus preventing the cream from being thrown out by the action of the beaters. The brace bar also serves to steady the end of the arm in which the beater shaft is stepped. When it is desired to remove the cover for the inspection of the butter, the brace is turned up out of the way and the cover removed without disturbing the beater shaft.

If it is desired to remove the churn and shaft to be washed or for any other purpose the buttons are partially turned, which allows the arm and brace bar to be turned completely out of the way as shown in red lines in the drawing.

What I claim as my invention herein and desire to secure by Letters Patent: is,

The combination of the brace bar M, hinged arm G, buttons O, O', with a vertical barrel churn and rotary dasher shaft L, the whole being constructed and arranged in the manner and for the purposes herein set forth.

The above specification of my improvement in churns signed this 17th day of January 1861.

JOHN STILWELL.

Witnesses:
OCTAVIUS KNIGHT,
JAMES H. GRIDLY.